Sept. 11, 1945. R. H. HILL 2,384,677
APPARATUS FOR UTILIZING LIQUEFIED GASES
Filed Aug. 16, 1941
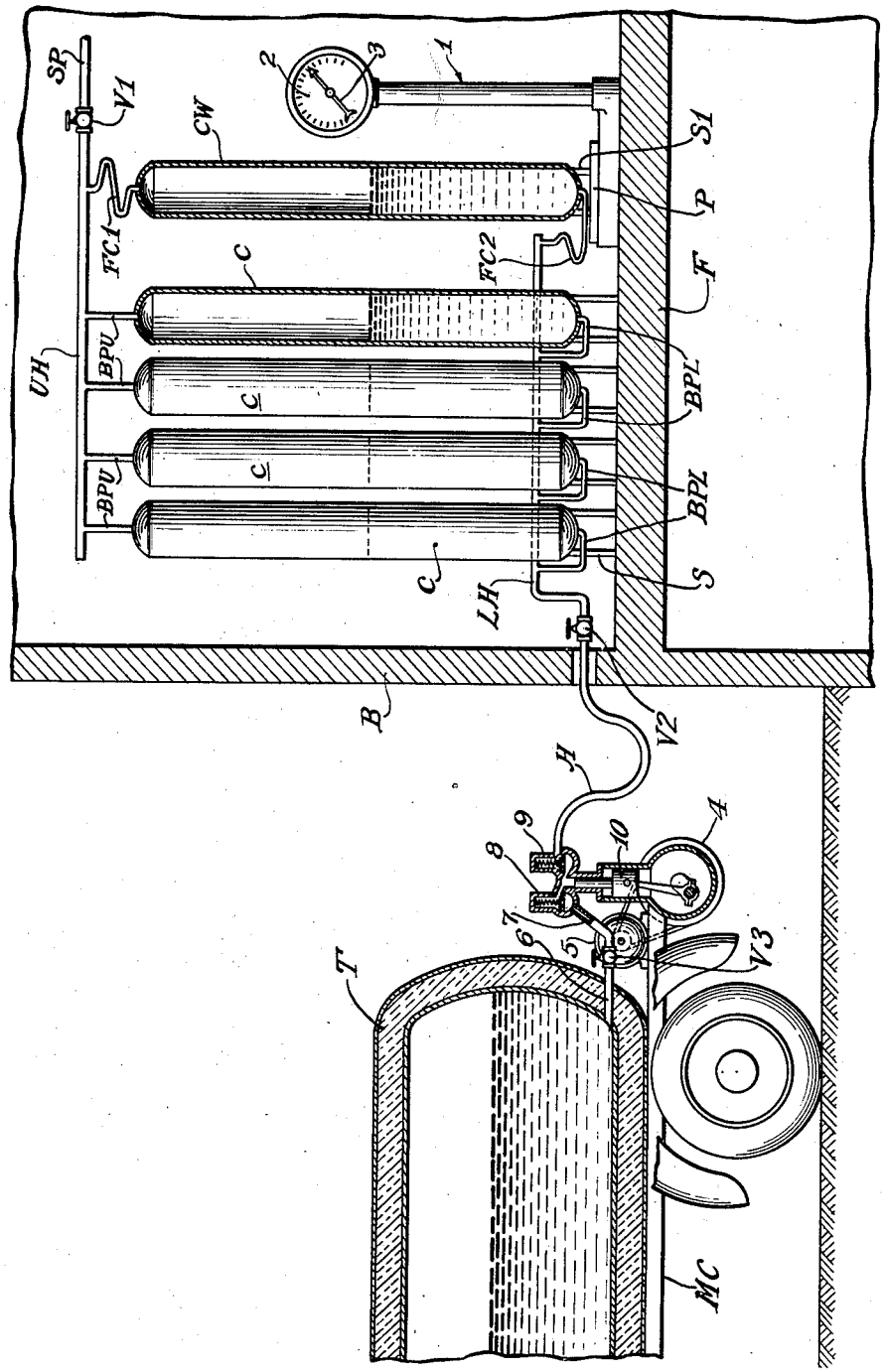
Inventor:
Robert H. Hill
By Wallace and Cannon
Attorneys Patented Sept. 11, 1945

2,384,677

UNITED STATES PATENT OFFICE 2,384,677

APPARATUS FOR UTILIZING LIQUEFIED GASES

Robert H. Hill, Elgin, Ill., assignor to J. E. Taylor, Elgin, Ill., doing business as Taylor Engineering Company Application August 16, 1941, Serial No. 407,145

3 Claims. (Cl. 62—1)

This invention relates to apparatus and methods for utilizing liquefied gases.

Heretofore liquefied gases, of which liquefied carbon dioxide is exemplary, have been customarily introduced into steel drums or cylinders which have been transported from the place of filling to the place of utilization and inasmuch as the cylinders themselves weigh appreciably more than the gas contained therein, this method of handling such gases has been relatively expensive and cumbersome.

Moreover, when cylinders of the aforesaid character have been arranged in banks it has been customary to draw gas from but one of the cylinders in the bank until this cylinder was exhausted and to then open another and filled cylinder into the system to disconnect the previously utilized cylinder from the system so as to enable replacement thereof with a filled cylinder. This sometimes resulted in interruption of the operation where the gas was utilized, as where carbon dioxide was supplied to a carbonator, for it has been necessary to interrupt operation of the carbonator when one cylinder was exhausted and until another cylinder was opened into the system.

Furthermore, even in instances where two or more cylinders in a bank thereof were so connected to the system that gas could be drawn therefrom simultaneously, there have been instances where all of the gas was exhausted from the cylinders and it was necessary to interrupt the operation utilizing the gas until the supply could be replenished. This latter condition has primarily arisen because in many instances the rate of utilization of the gas varies and especially in such circumstances it is difficult to determine just how much gas has been withdrawn from the cylinders. Furthermore there is no satisfactory way for determining the quantity of gas contained in a cylinder except by weighing the cylinder and then subtracting the weight of the cylinder from the weight so ascertained, but such a procedure is not always convenient or possible since the cylinders are usually mounted in fixed supports. Furthermore, the cylinders in which gas under pressure is customarily supplied are quite heavy and moreover relatively fixed pipe connections are made thereto when in the position of use, and heretofore where it has been desired to weigh a cylinder to determine the quantity of gas therein it has been necessary to shut the valve usually provided on the cylinder and to disconnect the cylinder from the pipe connections made thereto and usually special equipment was employed for handling the heavy cylinder to enable weighing thereof, all of which, as will be appreciated, is troublesome and wasteful. Moreover, many users have not been equipped to weight the cylinders and as a result not infrequently a user has completely exhausted gas from all of the cylinders on hand and has had to interrupt the operation utilizing the gas until a fresh supply of gas could be obtained from the source of supply thereof.

Thus among the objects of my invention are to enable gas to be drawn simultaneously from a plurality of storage cylinders and at all times to enable the quantity of gas remaining in the cylinders to be determined so as to thereby enable a supply of gas to be kept available and thereby obviate interruptions of operations utilizing the gas because of the exhausting of the available supply of gas.

It has been proposed heretofore to permanently mount cylinders or other gas storage receptacles at the place of use and to so arrange such cylinders that gas in solid form could be introduced thereinto after which the cylinders were suitably sealed and the gas in solid form was then liquefied and gasified by absorbing heat from the cylinders and the surrounding atmosphere. Here again, however, there have been objections to this practice for some gas always remained in the containers which was wasted when the containers were opened to enable introduction of a fresh supply of gas thereinto. Furthermore, where the cylinders were opened to the atmosphere so as to enable a supply of gas to be introduced thereinto some air was inevitably introduced into the containers and thereafter into the system, and in some uses to which gases of the nature to which this invention pertains are put such introduction of air into the system was objectionable and, in some instances, dangerous. Furthermore, when such cylinders were opened to the atmosphere, the likelihood that dirt and other foreign matter would be introduced thereinto was always present and objectionable, and moreover moisture, particularly in the form of frost collected in the cylinders, was sometimes introduced thereinto and into the system with which they were used which, of course, is highly disadvantageous. Moreover, such arrangements were subject to many of the objections to other prior practices, of which some are explained above, and primarily this practice of supplying gas in solid form did not enable ready ascertainment of the quantity of gas available.

Thus, still another object of my invention is to enable gas to be introduced into one or more permanently mounted storage containers therefor without opening such containers to the atmosphere so as to avoid the aforesaid and kindred objections to prior arrangements.

Still another object of this invention is to utilize a plurality of containers into which gas may be introduced and interconnect such containers to common headers at both the bottoms and tops thereof whereby the liquefied gas in the containers may seek a common level and gas may be withdrawn simultaneously from all of the containers.

Yet other objects are to so interconnect a plurality of containers for liquefied gas that liquefied gas contained therein may seek a common level and to so arrange at least one of the containers that the quantity of gas contained therein may be readily ascertained at all times and to so relate the other container or containers to such container or containers as to thereby enable the quantity of gas in all of the containers to be readily ascertained.

A more specific object of the invention is to so associate a container for liquefied gas with a scale or other means for determining the quantity of gas contained therein that the quantity of gas contained in such container may be readily ascertained and to so associate and relate other containers in the system with each container so arranged that by determining the quantity of gas in at least one of such containers the quantity of gas in the other containers may be readily ascertained.

Other and further objects of the present invention will be apparent from the following description and claims and are illustrated in the accompanying drawing which, by way of illustration, shows a preferred embodiment and the principle thereof and what I now consider to be the bese mode in which I have contemplated applying that principle. Other embodiments of the invention embodying the same or equivalent principle may be used and structural changes may be made as desired by those skilled in the art without departing from the present invention and the purview of the appended claims.

The accompanying drawing is a diagrammatic illustration of a selected embodiment of my invention.

In the accompanying drawing I have fragmentally illustrated a building B having a floor F therein on which a plurality of brackets or other suitable supports S are fixedly mounted, and a cylinder C is fixedly supported by each of these brackets. In the present instance I have shown four cylinders C supported by brackets S, but it will be understood that this number of cylinders and the manner in which such cylinders are supported is merely illustrative of a wide variety of arrangements to which resort might be had for, in accordance with one aspect of my invention, it is only essential that a plurality of cylinders as C be supported in a fixed position.

An upper header UH and a lower header LH are provided and through the intermediary of suitable branch pipes as BPU the upper part of each cylinder C is connected to the upper header UH while, through the intermediary of branch pipes as BPL, the bottom of each of the cylinders C is connected to the lower header LH. A supply pipe SP leads from the upper header UH to the place of utilization of the gas that is drawn from the cylinders C. A suitable valve VI is interposed between the header UH and the supply pipe SP whereby the flow of gas from the upper parts of the cylinder C through the branch pipes BPU and upper header UH to the supply pipe SP may be controlled, and it will be understood that by shutting the valve VI the supply pipe SP may be disconnected from the upper header UH to thereby shut off the flow of gas from the cylinders C. Furthermore, by reason of the interconnection of the bottoms of each of the cylinders C through the lower header LH, the liquefied gas in the cylinders C will seek a common level therein.

In addition to the foregoing I provide at least one cylinder as CW. In the present instance, this cylinder is supported by a bracket SI that is mounted on the platform P of a suitable platform scale, generally indicated by 1, the arrangement being such that the cylinder CW is supported solely by the platform P of the scale 1. The platform scale includes a calibrated scale or dial 2 over which a pointer 3 is movable in accordance with the weight impressed on the platform P.

It is desirable, though not essential, that the calibration of the calibrated scale 2 of the scale 1 to be so related to the tare weight of the cylinder CW that, when the cylinder CW is emptied of gas, the pointer 3 will register with the zero calibration of the calibrated scale 2. Also desirably, the calibrations of the scale 2 are arranged so as to indicate the quantity of gas in the cylinder CW when gas is introduced into the cylinder CW. For example, such calibrations may be such as to register the number of pounds of gas in the cylinder CW.

The upper part of the cylinder CW is connected through a flexible connection FC1 with the upper header UH while the bottom thereof is connected with the lower header LH through a flexible connection FC2 and desirably the calibration of the calibrated scale 2 to the tare weight of the cylinder CW is such that the weight of the flexible connections FC1 and FC2 constitutes a part of the tare weight, which is to say, the pointer 3 registers with the zero index of the calibrated scale 2 when the cylinder CW is empty and the flexible connections FC1 and FC2 are connected thereto and respectively to the upper header UH and the lower header LH. Moreover, the platform P or other support for the cylinder as CW is so related to the positions of the supports S that the mean position of the cylinder as CW, between the full and empty positions thereof, is related to the fixed positions of the cylinders C whereby, when the liquefied gas seeks a common level in each of the cylinders C and the cylinder CW, the quantity of liquefied gas in each cylinder will be related to the quantity in each other cylinder.

It is by reason of the fact that the cylinder CW is connected to the lower header LH that liquid contained therein will seek a common level with liquid in other of the cylinders C that are connected to the header LH. Desirably each of the cylinders C is of the same size as the cylinder CW for by resort to this arrangement, when reference is made to the calibrated scale 2 and the position of the pointer 3 relative thereto, it will only be necessary to multiply the reading thus indicated by the number of cylinders C to determine the quantity of gas available in all of the cylinders connected to the headers UH and LH. However, while it is advantageous to size each of the cylinders C so as to be equal to the size of the cylinders CW, it will be understood that any other relation between the cylinder as CW and the cylinders C might be provided as, for example, if cylinders C could be twice the capacity of the cylinder CW or any other interrelation might be established so long as the arrangement is such that, by reason of the fact that the liquid may seek a common level in each of the cylinders, an interrelation between the quantity of gas in each of the cylinders C and that in the cylinders CW is established.

While liquefied gas may be supplied to the cylinders C and CW in a wide variety of ways within the purview of my invention, I have found it advantageous to transport the liquefied gas from the point of production or storage thereof to the point of use, such as the aforesaid arrangement of cylinders C and CW, in the manner disclosed in Geertz and Taylor Patent No. 2,180,321, Patented November 14, 1939. In accordance with this disclosure the liquefied gas is introduced into a tank T mounted on a motor truck chassis MC or the like to enable transportation of the tank from place to place. When resort is had to this arrangement, a pump, generally indicated by 4, is mounted on the chassis MC and is adapted to be driven by an electric motor 5 or other suitable source of power. An outlet pipe 6 is led from the lower part of the tank T to a valve V3 from which a pipe 7 leads to the intake valve 8 of the pump 4. A flexible hose H or the like, that is capable of withstanding high pressure, is led from the outlet valve 9 of the pump 4 to the valve V2 so that when the piston 10 of the pump 4 is set in operation and the valves V3 and V2 are open, after the hose H has been connected to the valve V2, liquefied gas may be pumped from the tank T into the cylinders C and CW through the lower header LH.

If desired, the cylinders as C or CW for storing gas under pressure might be arranged in such a way that solidified gas might be introduced thereinto but in any event the arrangement, and the method of procedure, are such that gas may be introduced into a plurality of cylinders that are so interconnected that there may be free intercommunication therebetween whereby, when the gas introduced thereinto is liquefied, the liquid may seek a common level in such cylinders. At least one of the cylinders in such a plurality thereof, as the cylinders CW, is associated with means operative to indicate the quantity of gas therein and each of the other cylinders in the plurality thereof is to be so related to such cylinder or cylinders that by ascertaining the quantity of gas in such cylinder or cylinders the quantity of gas in the other cylinders may be readily ascertained. In some instances in order to insure an accurate check on the quantity of gas in the plurality of containers connected to common headers as UH and LH, it will be advantageous to arrange more than one of the cylinders so as to enable the quantity of gas therein to be ascertained directly as, for example, by mounting two cylinders in association with a scale as 1 or other means for determining the quantity of gas therein.

Among the advantages of the present invention is that a plurality of gas containers may be so connected that gas may be drawn from all of the cylinders simultaneously, and this insures the availability of a relatively large quantity of gas and avoids the delays that might be occasioned if the gas were drawn from one cylinder until it was exhausted, which often in the past has necessitated interrupting use of the gas when one cylinder became exhausted and until the system was arranged to draw gas from another cylinder.

Furthermore, by arranging at least one of the cylinders in a plurality thereof so that the quantity of gas therein may be determined at all times and by so connecting and relating the other cylinders in the plurality thereof that upon ascertainment of the quantity of gas in one or more of the cylinders, the quantity of gas in all of the cylinders of the plurality thereof may be ascertained and it is possible to insure that an ample supply of gas will be available at all times primarily because the constant indication of the quantity of gas in the cylinders will enable the supply to be replenished before all of the gas has been exhausted from the cylinders or other containers.

Thus, while I have illustrated and described a preferred embodiment of my invention, it is to be understood that this is capable of variation and modification and I therefore do not wish to be limited to the precise details set forth but desire to avail myself of such changes and alterations as fall within the purview of the following claims:

I claim:

1. An apparatus of the character described including a plurality of interiorly unobstructed containers for the reception of liquefied gas under pressure, means interconnecting said containers and through which the liquefied gas in the containers may seek a common level as delivered to the containers, means unconnected with and independent of the interconnecting means for the rigid support of the lower ends of the containers to support the latter firmly against vertical movement, and means for ascertaining the quantity of liquefied gas contained in one of said containers, said containers being so related that, when the quantity of liquefied gas in said one of said containers is ascertained, the quantity of gas in all of said containers may be computed therefrom.

2. In an apparatus of the character described including a plurality of interiorly unobstructed containers for the reception of liquefied gas under pressure, an upper header to which the upper part of each of said containers is rigidly connected, a lower header to which the bottom of each of said containers is rigidly connected, means fixedly mounted at the lower ends of the containers and unconnected with the headers for cooperation with the headers to firmly support the containers, and means for ascertaining the quantity of liquefied gas contained in one of said containers, said containers being so related that, when the quantity of liquefied gas in said one container is ascertained, the quantity of gas in all of said containers may be computed therefrom.

3. In an apparatus of the character described including a plurality of containers for the reception of liquefied gas under pressure, an upper header to which the upper part of each of said containers is rigidly connected, a lower header to which the bottom of each of said containers is rigidly connected, said containers being of the same shape and size and being arranged in relatively compact side by side relation, another container having flexible connection at its upper and lower ends with the upper and lower headers respectively and having associated therewith a calibrated scale operable to indicate the quantity of gas in any one of said rigidly mounted containers, and means unconnected with the headers and cooperating with the rigid connections between the first mentioned containers and the headers to firmly support the first mentioned containers, said first mentioned containers being so related in size and shape that, when the quantity of gas in one of said first mentioned containers is ascertained, the quantity of gas in all of said containers may be computed therefrom.

ROBERT H. HILL.